United States Patent
Brady

[19]

[11] Patent Number: 5,613,139
[45] Date of Patent: Mar. 18, 1997

[54] HARDWARE IMPLEMENTED LOCKING MECHANISM FOR HANDLING BOTH SINGLE AND PLURAL LOCK REQUESTS IN A LOCK MESSAGE

[75] Inventor: James T. Brady, San Jose, Calif.

[73] Assignee: International Business Machines Corporation, Armonk, N.Y.

[21] Appl. No.: 241,922

[22] Filed: May 11, 1994

[51] Int. Cl.$^6$ .................................................. G06F 13/00
[52] U.S. Cl. ...................... 395/800; 395/838; 395/856; 364/230; 364/238.3; 364/260; 364/DIG. 1
[58] Field of Search ..................... 395/200.03, 200.08, 395/826, 829, 830, 834, 837, 838, 839, 856, 857, 860, 882, 288, 292, 427, 474, 650, 728, 800, 825, 828, 835, 841, 848, 287; 364/131, 134, 138; 370/85.1, 85.6, 95.2, 92, 94.1

[56] References Cited

U.S. PATENT DOCUMENTS

| | | | |
|---|---|---|---|
| 4,308,580 | 12/1981 | Ohtaki ................................. | 395/490 |
| 4,937,733 | 6/1990 | Gillett, Jr. et al. ..................... | 395/288 |
| 4,965,718 | 10/1990 | George et al. ........................ | 364/200 |
| 5,060,144 | 10/1991 | Sipple et al. .......................... | 364/200 |
| 5,115,499 | 5/1992 | Stiffler et al. ......................... | 395/425 |
| 5,161,227 | 11/1992 | Dias et al. ............................ | 395/650 |
| 5,175,837 | 12/1992 | Arnold et al. ........................ | 395/425 |
| 5,237,694 | 8/1993 | Horne et al. ......................... | 395/726 |
| 5,283,870 | 2/1994 | Joyce et al. .......................... | 395/479 |
| 5,293,491 | 3/1994 | Leung et al. ......................... | 395/848 |
| 5,321,825 | 6/1994 | Song .................................... | 395/490 |
| 5,341,510 | 8/1994 | Gillett, Jr. et al. ..................... | 395/800 |
| 5,423,044 | 6/1995 | Sutton et al. ......................... | 395/726 |
| 5,442,785 | 8/1995 | Roffe et al. .......................... | 395/600 |

Primary Examiner—Alpesh M. Shah
Attorney, Agent, or Firm—Ohlandt, Greeley, Ruggiero & Perle

[57] ABSTRACT

A parallel computing system includes multiple nodes, each node including a processor with software control. The parallel computing system includes a distributed lock mechanism that controls access to system resources, the lock mechanism distributed among the multiple nodes, with each node including hardware-based lock processing apparatus. Such apparatus comprises a communication interface for receiving and transmitting control and data messages and a table arrangement for storing plural lock words. A state machine is present in each node and is connected to the table arrangement and to the communications interface and is responsive to a received lock request to perform hardware-controlled lock processing functions. Those functions include: reading a stored lock word from the table arrangement; performing the lock operation on the stored lock word according to parameters in the received lock request; compiling a message which grants the lock request if the comparison indicates a match, or a message denying the lock request if the comparison indicates a non-match, or a message indicating completion of a specified operation. The state machine performs the function without invoking the processor and/or its software control, thereby enabling lock grant/denial/information messages to be handled independently of software controlled processor procedures.

14 Claims, 5 Drawing Sheets

LOCK REQUEST — (ADDRESSED TO LOGICAL INPUT PORT)
| BYTE(S) | CONTENTS |
|---|---|
| 0 – 3 | LOCK ADDRESS (OFFSET INTO LOCK TABLE) |
| 4 – 7 | COMPARE WORD |
| 8 – 11 | SWAP WORD |
FIG. 3
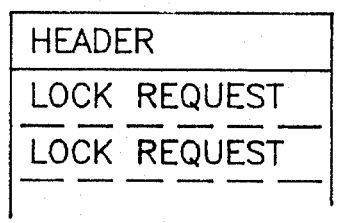
FIG. 3A
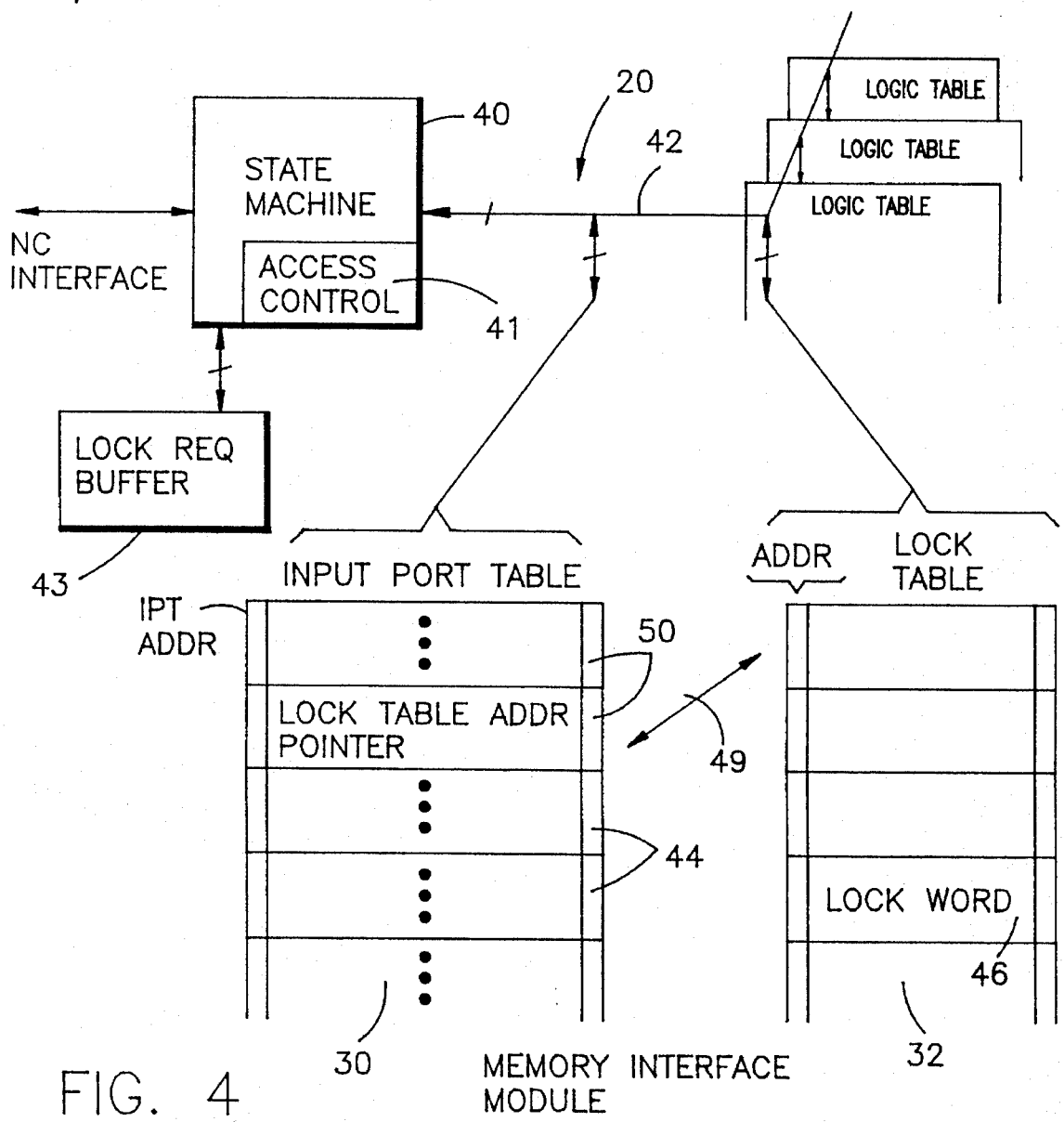
FIG. 4

HARDWARE IMPLEMENTED LOCKING MECHANISM FOR HANDLING BOTH SINGLE AND PLURAL LOCK REQUESTS IN A LOCK MESSAGE

FIELD OF THE INVENTION

This invention relates to resource access control in parallel/distributed computing systems and, more particularly, to a hardware-implemented locking mechanism that is non-software controlled when processing a lock request.

BACKGROUND OF THE INVENTION

Modern parallel/multi-processing systems employ many processor-containing nodes which simultaneously perform multiple tasks that are either related or independent. Each node communicates with all other nodes via a communication network. Each node includes a processor which operates under control of its own operating system and functions as the overseer of all procedures executed within the node. It is often the case that one or more nodes, in the course of performing their respective procedures, will require access to system resources housed on another node or nodes. To prevent contention between nodes for a shared resource, a locking mechanism is provided to guarantee that competing nodes do not simultaneously attempt to use or modify a same shared resource during performance of different procedures. A locking system enables synchronization of the use of shared resources amongst competing nodes and enables organized functioning of the multi-processor system.

As is known, a lock generally constitutes one or more words in a memory which manifest a state indicating whether a resource associated with that lock is busy or free. When a lock request is received and manifests a value that differs from the value of the lock, it is known that the lock is in use and unavailable to the requestor. If, by contrast, a received lock request matches a stored lock value, then it is known that the associated resource is available and steps are taken to (1) grant ownership of the lock to the requesting party and (2) to change the stored lock value so that another requestor will not be able to access the lock.

To enable the described lock protocol, prior art systems have employed a "Compare and Swap" hardware instruction which enables a requestor's lock value to be compared to the stored lock value and, if equality of values is found, to swap in a new value in place of the stored lock word, while simultaneously granting ownership of the lock to the requestor.

The prior art includes various locking schemes which are employed when memory is shared by two or more processors. For instance, in U.S. Pat. No. 4,965,718 to George et al, a memory contains "semaphore" data which indicates the status of a requested resource. A requestor transmits a "directive" which includes an address of a selected memory location, including a semaphore comparison value, and an identification of the requestor. If the semaphore is found to indicate a busy status (a non-comparison), the directive is stored in the selected memory element where the semaphore data is stored and the state of the semaphore data is thereafter monitored until a change occurs. In this manner, controlled access is achieved for the requested resource.

U.S. Pat. No. 5,175,837 to Arnold et al, is a further shared memory system wherein a central memory stores a directory of lock bits. Each lock bit controls a predefined segment of system memory. When the lock bit is set in an unlock state, access to the protected area of memory is allowed. A fairness procedure processes denied lock requests and sequentially positions them in a first come, first served queue.

U.S. Pat. No. 5,115,499 to Stiffler et al, describes a resource control procedure which employs a memory that indicates a current state of the resource and the identity of the processing element currently utilizing the resource. The memory location can be interrogated by any of the processing elements and thereby performs a lock allocation function.

U.S. Pat. No. 5,060,144 to Sipple et al, describes a shared memory system that includes a special lock processor. The lock processor enables requests for objects stored in a shared memory to be properly allocated amongst contending users.

Other prior art systems have employed a "pass the buck" approach to lock management. In such systems, a table containing the state of all locks is passed among nodes comprising the system. The node that has ownership of the lock table has access to the locks listed therein. Substantial processing overhead is required to transfer the lock table between nodes and, in systems where a large number of nodes are present, a substantial latency period may occur between table ownership periods.

As the number of nodes in multi-processing systems have increased (presently being on the order of thousands), it is preferred that any locking mechanism be distributed amongst the nodes, rather than being dependent upon a central controlling processor. Such a distributed feature enables the locking system to be recovered in the event of failure of a node, as contrasted to a possible complete system failure when a central lock processor fails.

As above indicated, a lock processing system is required to enable nodes in a multi-processing system to operate in a synchronous manner. If however, lock processing is software-controlled in a node, substantial amounts of system time need to be allocated to the lock processing function. As a result, overall system performance is degraded when multiple nodes implement simultaneous lock requests during performance of a system-wide procedure.

Accordingly, it is an object of this invention to provide a parallel/multi-processing system with a distributed lock processing procedure.

It is another object of this invention to provide improved lock processing apparatus for a parallel/multi-processing system wherein nodal processor-involvement is minimized.

It is another object of this invention to provide an improved lock processing mechanism which enables plural lock requests from a single requesting node to be handled on an atomic basis.

It is yet another object of this invention to provide an improved locking mechanism for a parallel/multi-processing system which implements lock processing on a real-time hardware basis rather than a software-controlled basis.

SUMMARY OF THE INVENTION

A parallel computing system includes multiple nodes, each node including a processor with software control. The parallel computing system includes a distributed lock mechanism that controls access to system resources, the lock mechanism distributed among the multiple nodes, with each node including hardware-based lock processing apparatus. Such apparatus comprises a communication interface for receiving and transmitting control and data messages and a table arrangement for storing plural lock words. A state machine is present in each node and is connected to the table arrangement and to the communications interface and is responsive to a received lock request to perform hardware-controlled lock processing functions. Those functions include: reading a stored locked word from the table arrangement; comparing the stored lock word with a lock word in the received lock request; compiling a message which grants the lock request if the comparison indicates a match, or a message denying the lock request if the comparison indicates a non-match. The state machine performs the function without invoking the processor and/or its software control, thereby enabling lock grant/denial messages to be handled independently of software controlled processor procedures.

DESCRIPTION OF THE DRAWINGS

FIG. 3 is a chart illustrating contents of a lock request received from a requesting node.

FIG. 3a illustrates a lock message with plural lock requests.

FIG. 4 is a more detailed block diagram of a memory interface module contained in each node which implements the invention hereof.

DETAILED DESCRIPTION OF THE INVENTION

Figure 1:
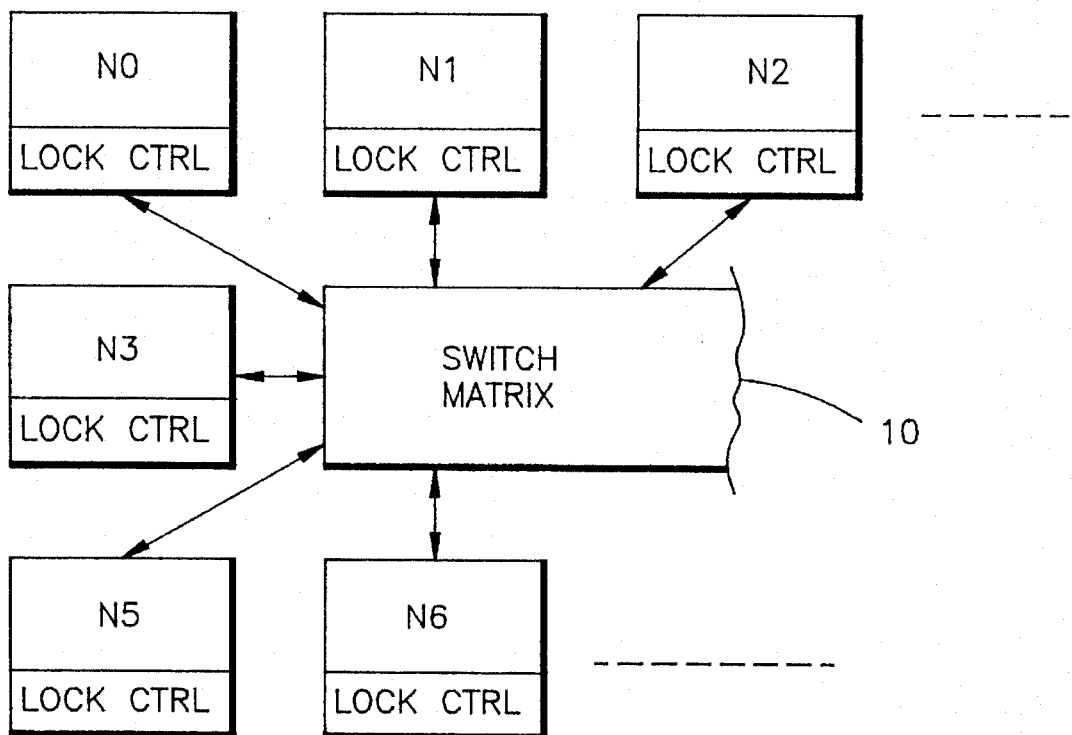
FIG. 1 is a high level block diagram of a parallel/multiprocessor system that includes a distributed lock control mechanism in accordance of the invention hereof.

Referring to FIG. 1, a plurality of nodes N0–N6 are shown which communicate with each other through a switch matrix 10 which may either be centralized or distributed. Each of nodes N0–N6, etc. include and/or "own" resources which will be called upon by other nodes during execution of distributed procedures. For instance, one node may control access to a disk drive which may be accessed by any other node. Each of nodes N0–N6, etc. includes a hardware-based lock control mechanism which enables appropriate control of access to the aforesaid resources. It is to be understood that the node containing the lock need not contain the resource. A node may be configured as a disk storage node with plural disk storage modules, an electronic storage node with large capacity dynamic or staticRAM modules, an input/output node enabling system communication with other systems, etc.

Figure 2:
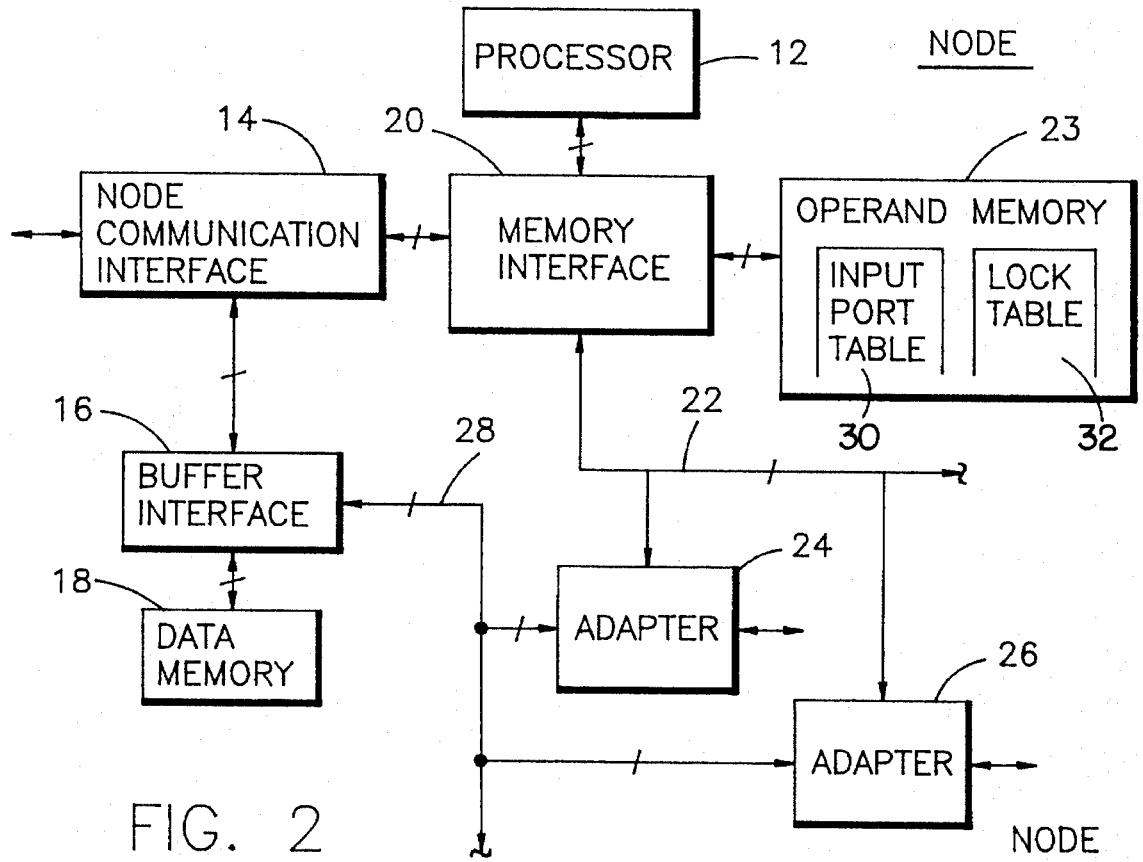
FIG. 2 is a high level block diagram of a processor node shown in FIG. 1.

FIG. 2 illustrates a high level block diagram of a node. Each node includes a processor 12 which operates under software control to perform various procedures within the node. Communications with other nodes is handled via node communication interface 14. Incoming data packets to node communication interface 14 may be of two types, i.e. control packets and data packets. Received data packets are buffered in a buffer interface 16 and their data is stored in data memory 18.

Control packets are fed to a memory interface 20 which decodes control messages contained therein and, in combination with data stored in operand memory 23, enables various control functions to be carried out within the node. A bus 22 carries control outputs from memory interface 20 to various adapter modules 24, 26, etc. which connect to other apparatus within a node (e.g. disk storage, additional random access memory, external I/O interface modules, etc.). Data is fed to adapter modules 24, 26 via buffer interface 16 and bus 28.

Memory interface 20 controls many functions within the node, however, for the purposes of this description, only control of that portion of the locking mechanism resident within the node will be described. To accomplish lock control, memory interface 20 has access to two tables in operand memory 23, i.e. an input port table 30 and a lock table 32. Input port table 30 includes at least one entry for each "logical" input port to the node. Each node is provided with many "logical" input ports, each port capable of having plural locks associated therewith. For instance, the system of FIG. 1 may have tens of thousands of logical input ports, each logical input port having hundreds of thousands of locks associated therewith. As a result, memory interface module 20 may have access to tens of thousands of input port tables 30.

Each input port table includes pointers to lock table 32 wherein lock words associated therewith may be found. The operation of memory interface module 20, input port table 30 and lock table 32 will be better understood from a detailed description of FIG. 4 below which illustrates hardware included within memory interface 20 that implements the lock control procedures.

Before turning to FIG. 4, however, it is useful to describe the message structure employed by the system of FIG. 1 to implement lock requests and lock responses. Lock requests are contained in control messages (i.e. lock messages) that are configured in packet form, each packet including a header with address data, control data and one or more lock requests. Each control message which embodies a lock request includes (see FIG. 3) up to 12 bytes of data, with bytes 0–3 including a lock address of a particular lock word that is sought. A lock address is an offset value from the beginning of a lock table 32. A lock message contains one or more of these lock requests as shown in FIG. 3a.

Each logical input port which is adapted to receive a lock request (a "lock port") contains an associated lock table 32 with lock words stored therein. As a result, a received lock address identifies where in a lock table 32 can be found the desired lock word. Bytes 4–7 of a lock request include a "compare word" and bytes 8–11 include a "swap word". The compare word and swap word enable the system to implement a compare and swap protocol. More specifically, if a received compare word matches a lock word at the lock address designated in the lock request, then a "grant of lock" message is compiled and transmitted to the lock requestor and the lock word is changed to the swap word, thereby preventing any other requestor from gaining access to the resource. When the lock owner is finished with the resource, a lock message is again transmitted which replaces the original swap word with the original compare word, thereby freeing the lock for a subsequent lock request.

In addition to containing a lock request, a lock request control message further contains an input port table address to an entry which contains a pointer 49 (see FIG. 4) to a lock table 32 containing the desired lock word. The input port table address thereby enables the incoming packet to identify where in input port table 30 may be found the address of a desired lock table 32, and by subsequent computation, to locate the desired lock word in lock table 32.

Referring to FIG. 4, the hardware within memory interface 20 that implements lock control will be described. Memory interface 20 contains a state machine 40 which operates the lock control system. State machine 40 includes plural, pre-wired, hardware subsystems which automatically respond to control instructions to carry out a required procedure. State machine 40 requires no software intervention during the handling of a lock request, the compilation of a response to a lock requestor, and the dispatch of a response to node communication interface 14 for transmission to the lock requestor. It is to be further understood that state machine 40 may also include ROM-based firmware that is employed for system control. As the structure of a state machine is well known to those skilled in the art, internal details of state machine 40 will not be described. Suffice to say, that it includes sufficient registers, logic circuitry and interconnecting control lines to implement an automatic lock control operation in response to an incoming lock control message.

State machine 40 connects via a bus 42 to both input port table 30 and a plurality of lock tables 32. There is one lock table 32 for each entry in an input port table which corresponds to an input port used as a lock port. Also connected to state machine 40 is a lock request buffer 43 which enables queuing of lock requests, before processing. As indicated above, input port table 30 has plural entries 44 wherein pointers may be found to lock tables 32 that store associated lock words 46.

It is to be understood that the operation of the circuitry of FIG. 4 proceeds without software intervention and without recourse to processor 12. This action enables lock requests to be handled via a linked series of circuit operations without software intervention and/or control. More specifically, each lock message is handled atomically. In other words, each lock message proceeds to completion without interruption, thereby enabling an immediate response to be constructed and transmitted to a lock requestor without software intervention. The only node which is required to incur software overhead in the handling of a lock messages is the node which desires to acquire or to free a lock. The lock holding node requires no software operation to respond to either a request for a lock or a message to free a lock.

Should a user desire that a node update its software upon responding to a request for a lock or a message to free a lock, an additional entry 50 may be appended to each entry in input port table 30. That entry signals processor 12 to institute an interrupt to processor 12 upon dispatch of a lock message by state machine 40 to node communication interface 14.

Figure 5:
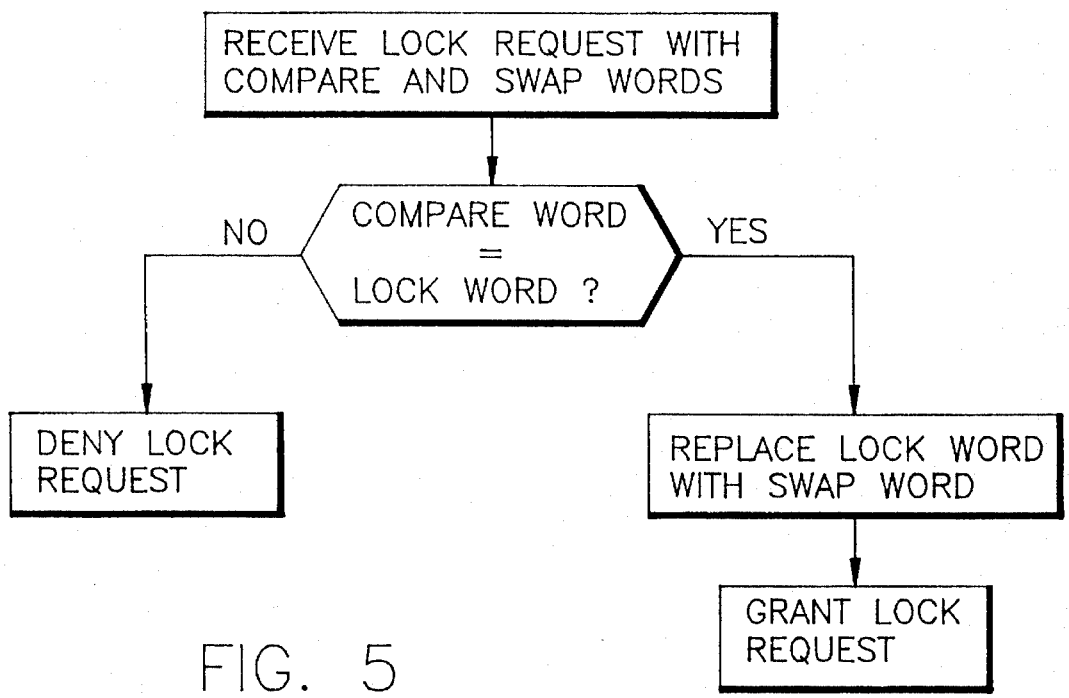
FIG. 5 is a high level logic flow diagram illustrating the operation of the invention when a "Compare and Swap" lock request is received.

Referring now to FIGS. 2, 4 and 5, the operation of the invention will be described assuming a lock message contains a single lock request. Upon receipt of a packet, node communication interface 14 passes the packet to memory interface 20. The header of the packet is examined and the packet is identified as either a data or control packet. Assuming it is a control packet with a lock request, memory interface 20 identifies the addressed logical port and fetches the entry at that address from input port table 30.

Assuming a correct lock word address has been received, the lock word stored at the indicated address is returned to state machine 40. State machine 40 then compares the stored lock word to the received compare word in the lock request, and, if a match is found, compiles a message granting the lock request, which message is transmitted to node communication interface 14 and then to the requesting node. If the compare word does not match the accessed lock word, a message is compiled denying the lock request.

When state machine 40 accesses a lock word 46 from lock table 32, a memory busy flag is set in access control module 41 which denies access to the lock word 46. That denial of access continues until lock word 46 has been compared and found to either match or not match the received compare word. If a match is found, the received swap word is placed into lock table 32 in place of lock word 46. At that time, the memory busy flag is released, thereby enabling further lock messages to be processed. Upon dispatch of a lock response message to the requesting node, and assuming that an interrupt is desired to update processor 12, flag 50 causes an interrupt to be generated and the necessary data transmitted to processor 12.

Each of the lock processing operations takes place atomically within state machine 40 and proceeds to completion without interruption.

Figure 6:
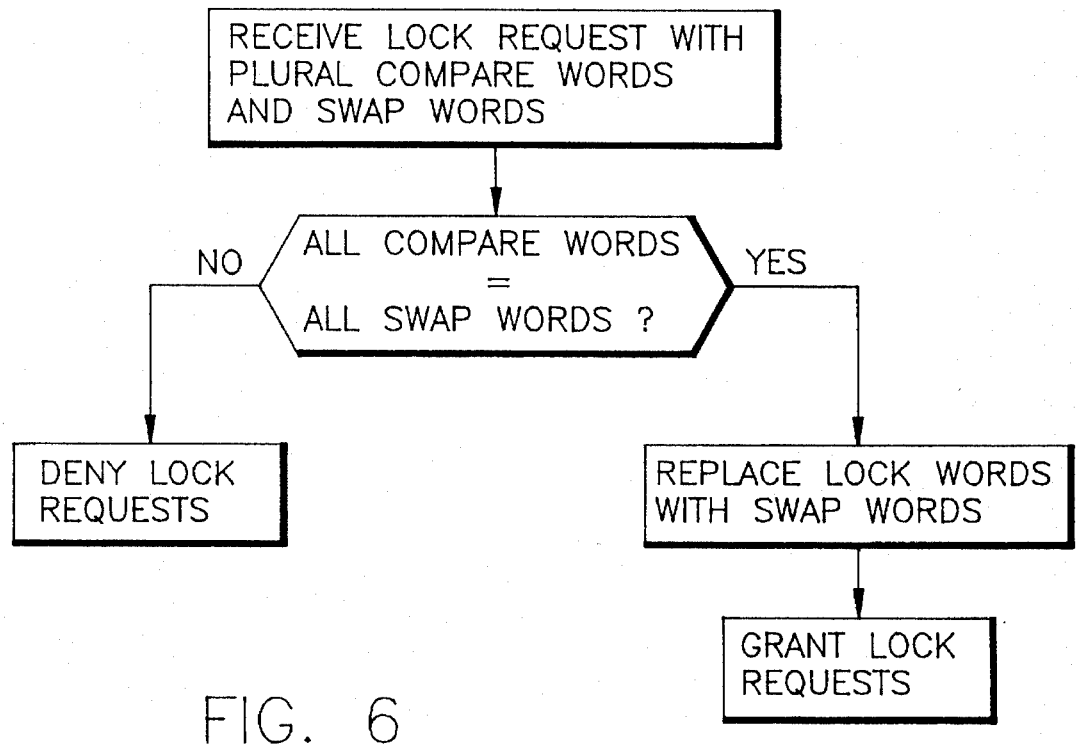
FIG. 6 is a high level logic flow diagram illustrating the operation of the invention when a "Compare and Swap on All Locks of a Set" lock request is received.

The description above has considered a control message including a single lock request, which lock request was atomically processed by state machine 40. Additional modes are supported by the invention which enable plural lock requests to be handled atomically and, further, enable data to be accessed with a lock request, all in an atomically processed manner. Those modes are as follows:

Compare and Swap on All Locks Out of a Set: (FIG. 6)

This mode enables a lock message to carry multiple compare and swap lock requests. If all of the compare words match addressed lock words, the lock requests are executed atomically as a group with the guarantee that no other lock operations can be interleaved with the execution of the requests. If any one of the lock words does not match a compare word, all of the lock requests of the set are not executed, that is, none of the swaps are performed.

Figure 7:
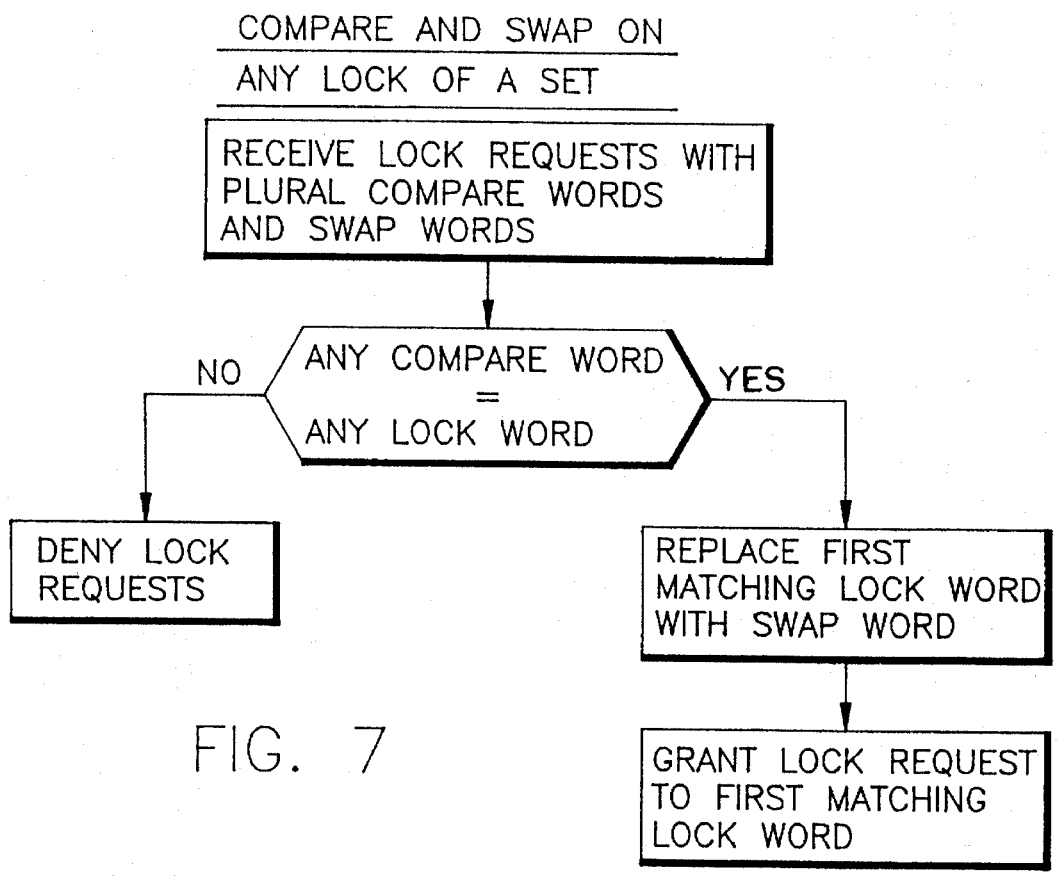
FIG. 7 is a high level logic flow diagram illustrating the operation of the invention when a "Compare and Swap on Any Lock of a Set" lock request is received.

Compare and Swap on any Lock Out of the Set (FIG. 7):

In this mode, the lock message carries multiple compare and swap lock requests and one and only one lock request is granted from the set (i.e., the first request that can be satisfied). Other requests in the same message are not executed. The lock address of the executed request is returned by state machine 40 to the requesting node.

Figure 8:
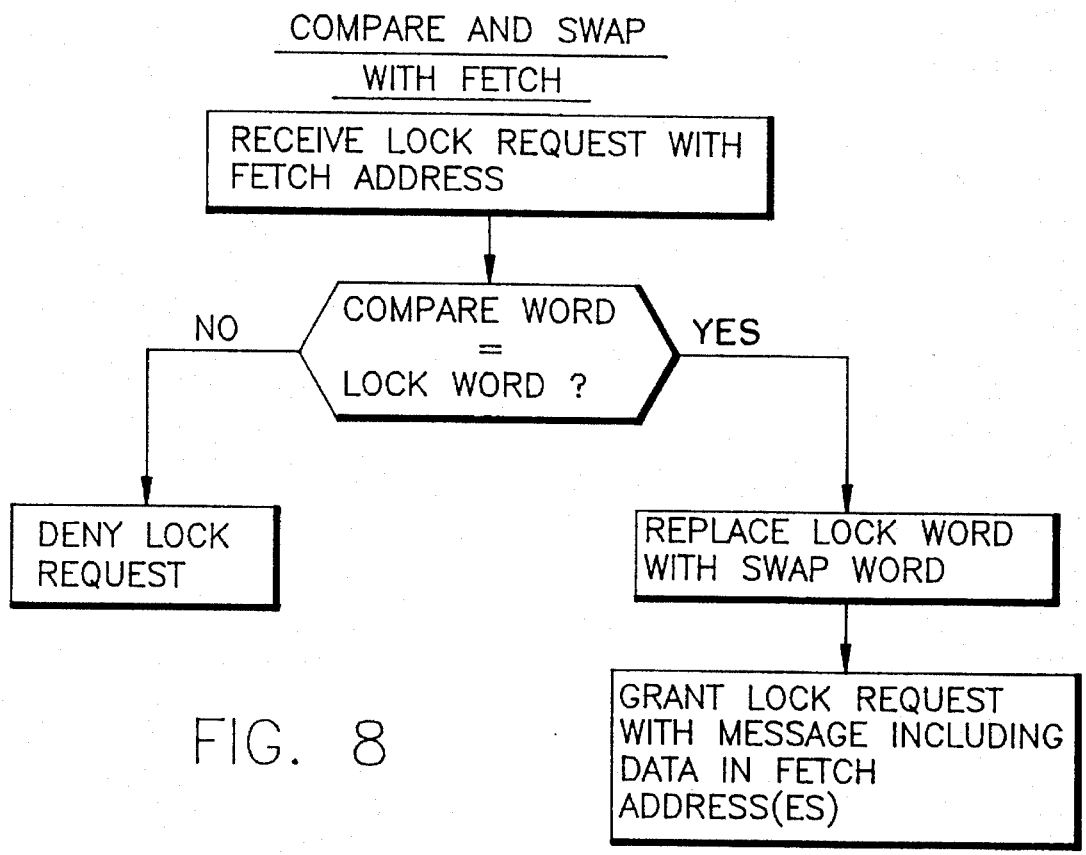
FIG. 8 is a high level logic flow diagram illustrating the operation of the invention when a "Compare and Swap with Fetch" lock request is received.

Compare and Swap with Fetch (FIG. 8):

This mode combines lock processing and data fetching into a single atomic operation. After a last compare-and-swap lock request in a lock message is executed, plural words immediately following the last lock words from lock table 32 are fetched and returned to the requesting node. In this case a lock word (e.g. lock word 46) is followed by one or more bytes of data which may indicate the identity of the node which has possession of the lock; and/or other status information regarding the lock.

Figure 9:
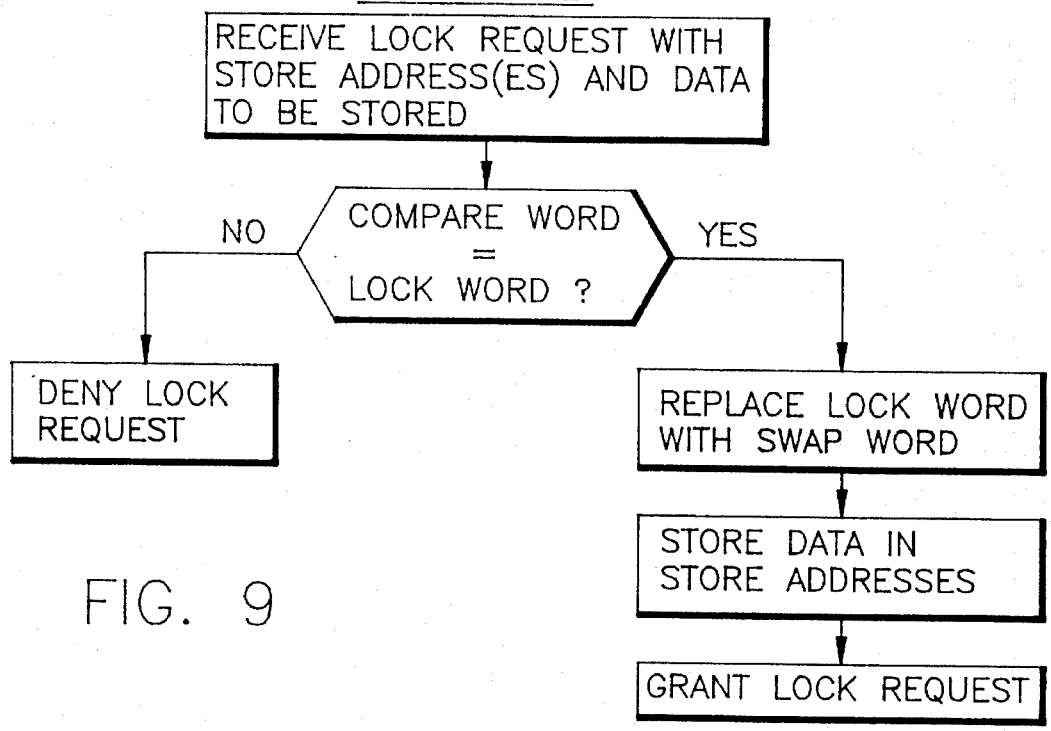
FIG. 9 is a high level logic flow diagram illustrating the operation of the invention when a "Compare and Swap with Store" lock request is received.

Compare and Swap with Store (FIG. 9):

This mode combines lock processing and data storage into a single atomic operation. N words of data are included in a control message that includes a lock request. If the lock request is executed successfully, the N words are written into lock table 32 in memory locations immediately following the last lock word written thereinto. If the lock request fails, no data is written.

Figure 10:
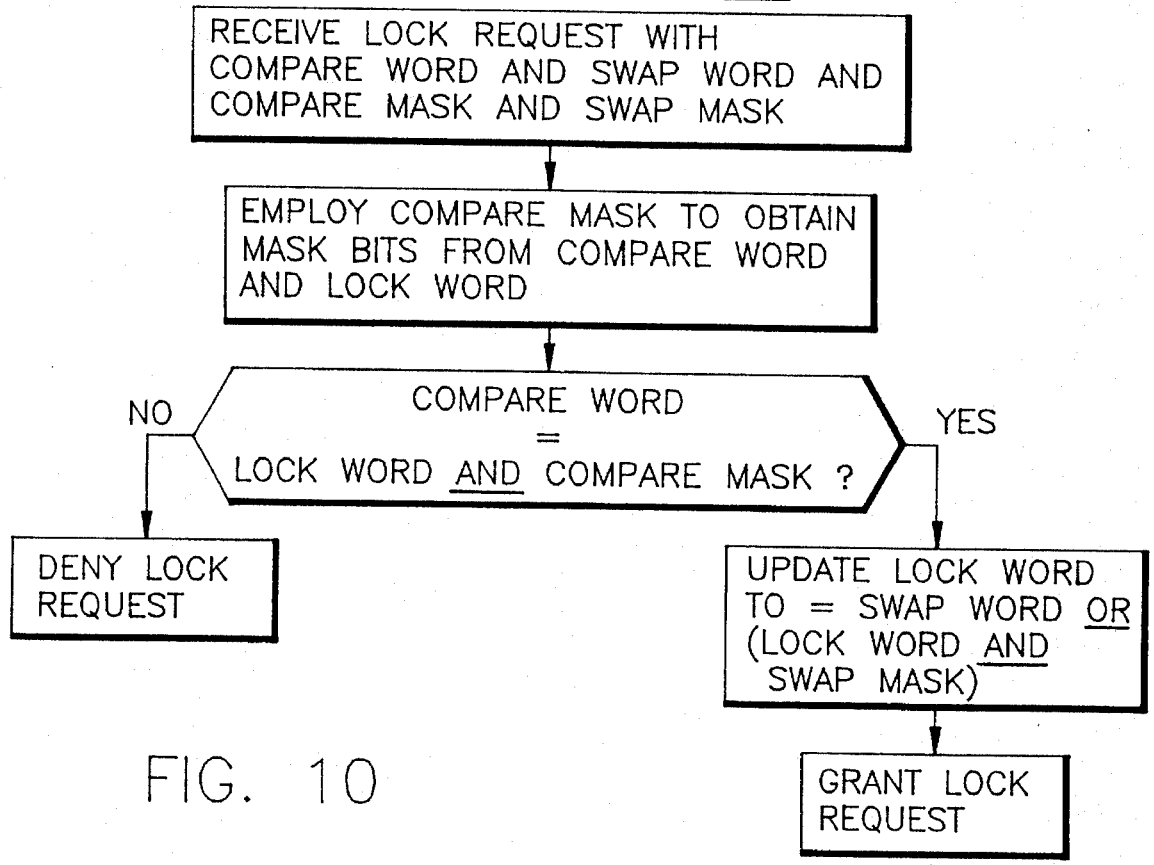
FIG. 10 is a high level logic flow diagram illustrating the operation of the invention when a "Compare and Swap with Bit Mask" lock request is received.

Compare and Swap with Bit Masks (FIG. 10):

To accomplish this function, a lock message contains a pair of additional fields (i.e. a Compare Mask and a Swap Mask) that are added to the compare-and-swap lock request. The Compare Mask is used by state machine 40 to select bits from both the Compare Word and Lock Word for comparison purposes. The Swap Mask is used by state machine 40 to select bits from both the Swap Word and Lock Word for swap operations. In other words, if the Compare Word matches the Lock Word AND Compare Mask, the Lock Word is updated to be the following: (Swap Word) OR (Lock Word AND Swap Mask).

The above described invention enables simple locks to be directly manipulated by sending of hardware messages and requires no software intervention on the node holding the lock table. Where multiple resources need to be acquired together, a group of locks can be acquired by sending a single hardware message, again requiring no software intervention on the node holding the lock table. A group of hardware locks can further form a shared logical lock. The exclusive right to a shared logical lock can be acquired by sending a control message asking for all associated hardware locks in the group. The shared right can be acquired by sending a control message asking for only one hardware lock in the group. The size of the group determines the number of nodes that can actively share the logical locks simultaneously.

A lock is usually used to protect some data. In a conventional system, acquiring the lock and accessing the data are done in separate steps, resulting in multiple messages. With the fetch and store extensions to the compare and swap protocol, a piece of data can be accessed in a guarded way with a single hardware message, again requiring no software intervention by the node holding the data.

A lock requesting node may wish its lock request to be queued if a lock is not available and to be notified when the lock becomes available at some later time. The interrupt procedure is enabled by flags 50 in input port table 30 and allows for implementation of queuing and notification. On the lock-requesting node, receipt of a lock request denial message from the lock holding node may be accompanied by a flag 50 from input port table 30. This flag enables an interrupt to occur at the lock holding node which notifies the software at that node of the lock request failure. A state machine at the lock holding node generates an interrupt to inform its local software/processor. At the same time, it transmits a message back to the lock requesting node. As a result, the lock holding node may queue the lock request while the lock requesting node software is processing the lock request denial. As a result parallel operations are enabled.

It should be understood that the foregoing description is only illustrative of the invention. Various alternatives and modifications can be devised by those skilled in the art without departing from the invention. For instance, while the invention has been described using a compare and swap protocol, other locking protocols are within the scope of the invention, e.g., Fetch and Add; Test and Set; atomic modify; etc. Accordingly, the present invention is intended to embrace all such alternatives, modifications and variances which fall within the scope of the appended claims.

I claim:

1. In a parallel computing system including multiple nodes, each node including a processor with software control, a lock system for controlling access to system resources, said lock system distributed among said multiple nodes, each node including hardware-based processing apparatus comprising:

a communication interface for receiving and transmitting control messages, one said control message containing plural lock requests to acquire possession of lock words, said lock requests comprising a lock message;

a table for storing plural lock words;

hardware logic circuitry connected to said table and to said communication interface and responsive to a received lock message to perform hardware-controlled, software independent, functions including: determining if a stored lock word from said table is available in response to said received lock message, compiling a message which grants said lock request if said determining indicates availability or a message denying said lock request if said determining indicates a nonavailability, said hardware logic circuitry performing said functions without invoking operation of software which controls said processor, whereby lock grant/denial messages are handled independently of software-controlled processor procedures; and wherein said hardware logic circuitry iteratively performs said determining function for each of said plural lock requests by accessing a lock word referred to by each lock request and determining availability of the lock word that is accessed, said hardware logic circuitry compiling a locking message response indicating results of said determining function and transmitting said message to a node which originated said locking message.

2. The parallel computing system recited in claim 1 wherein said hardware logic circuit, in said locking message response, grants a request for a lock only if all lock requests in said received lock message can be granted.

3. The parallel computing system recited in claim 1 wherein said hardware logic circuitry, in said locking message response, grants a request for a lock if at least one lock requested in said number of lock requests is available.

4. The parallel computing system as recited in claim 1 wherein said hardware logic circuitry, in said locking message response, grants a request for all locks determined to be available that are requested in said number of lock requests.

5. The parallel computing system as recited in claim 1 wherein said nodes include a node configured with disk storage units to provide said system with high capacity memory.

6. The parallel computing system as recited in claim 1 wherein said nodes include a node configured with random access memory to provide said system with high capacity volatile memory facilities.

7. In a parallel computing system including multiple nodes, each node including a processor with software control, a lock system for controlling access to system resources, said lock system distributed among said multiple nodes, each node including hardware-based processing apparatus comprising:

a communication interface for receiving and transmitting control messages;

a table for storing plural lock words;

a state machine connected to said table and to said communication interface and responsive to a received lock message which includes a compare word and a swap word to perform hardware-controlled, software independent, functions including: reading a stored lock word from said table, comparing said stored lock word with said compare word in said received lock request, compiling a message which grants said lock request if said comparing indicates a match and replacing said lock word with said swap word, or a message denying said lock request if said comparing indicates a non-match, said state machine performing said functions without invoking operation of software which controls said processor, whereby lock grant/denial messages are handled independently of software-controlled processor procedures;

wherein said state machine performs said hardware-controlled function for each control message by accessing a lock word referred by each control message and determining availability of the lock word that is accessed, said state machine compiling a control message response indicating results of said hardware-controlled function and transmitting said message to a node which originated said control message.

8. The parallel computing system recited in claim 7, wherein said state machine sets a control to said lock table to prevent access to said lock table address while said state machine determines whether or not to compile a message granting said lock request, whereby said lock word at said lock table address is prevented from modification until said state machine resets said control.

9. The parallel computing system recited in claim 7 wherein said lock request includes plural compare words, each compare word matching a desired lock word, and plural input port table addresses where lock table addresses are stored for said desired lock words, said table comprising:

a lock table for storing plural lock words at lock table addresses;

an input port table for storing plural entries at input port table addresses, each entry indicating a lock table address wherein an associated lock word is stored; and said state machine comparing said plural compare words with lock words at said lock table addresses in a single atomic procedure to determine a match or a non-match between said plural compare words and said lock words at said lock table addresses.

10. The parallel computing system recited in claim 9 wherein said state machine only compiles a message granting said lock request when all said compare words match all said lock words from said lock table addresses.

11. The parallel computing system as recited in claim 9 wherein if one of said compare words matches a lock word from said lock table addresses, said state machine compiles a message granting said lock request only with respect to the lock word that matches said one of said compare words.

12. The parallel computing system as recited in claim 7 wherein if said state machine compiles a message granting said received lock request in response to a compare word matching a lock word from a lock table address, said state machine further provides in said message, data from at least further lock table address which contain data pertaining to said lock word that matches.

13. The parallel computing system as recited in claim 7 wherein if said state machine compiles a message granting said received lock request in response to a compare word matching a lock word from a lock table address, said state machine stores in at least a further lock table address, data received as part of said received lock request.

14. The parallel computing system as recited in claim 7 wherein a received lock request includes a compare mask and a swap mask, said state machine selecting bits from a compare word and swap word contained in said received lock request in accordance with said compare mask and swap mask and employing said bits for comparison purposes with bits in a lock word or a swap word to be stored in said lock table.

* * * * *